Dec. 20, 1966   J. R. OISHEI   3,292,958
TRANSMISSION LINKAGE ASSEMBLY
Filed June 10, 1964
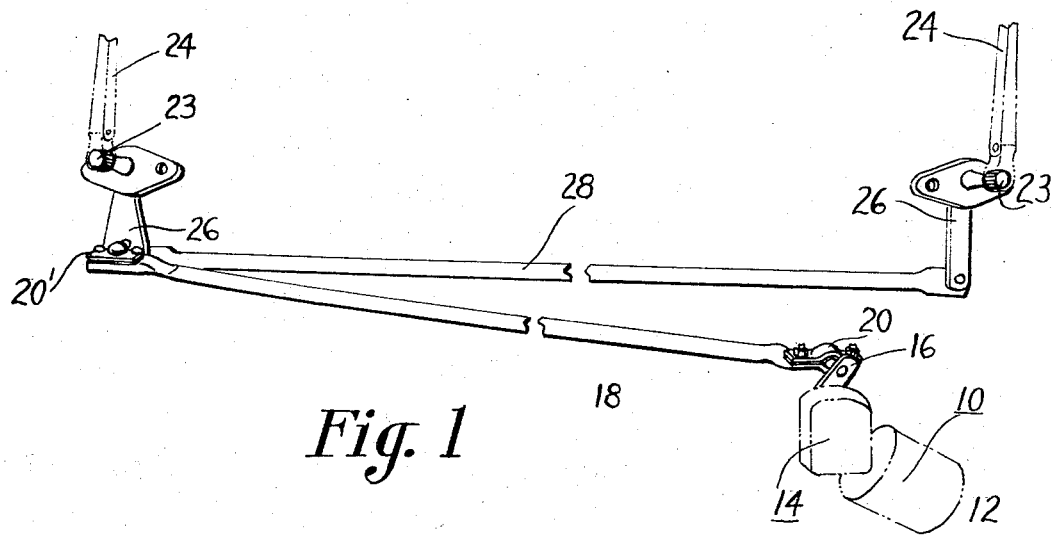
Fig. 1
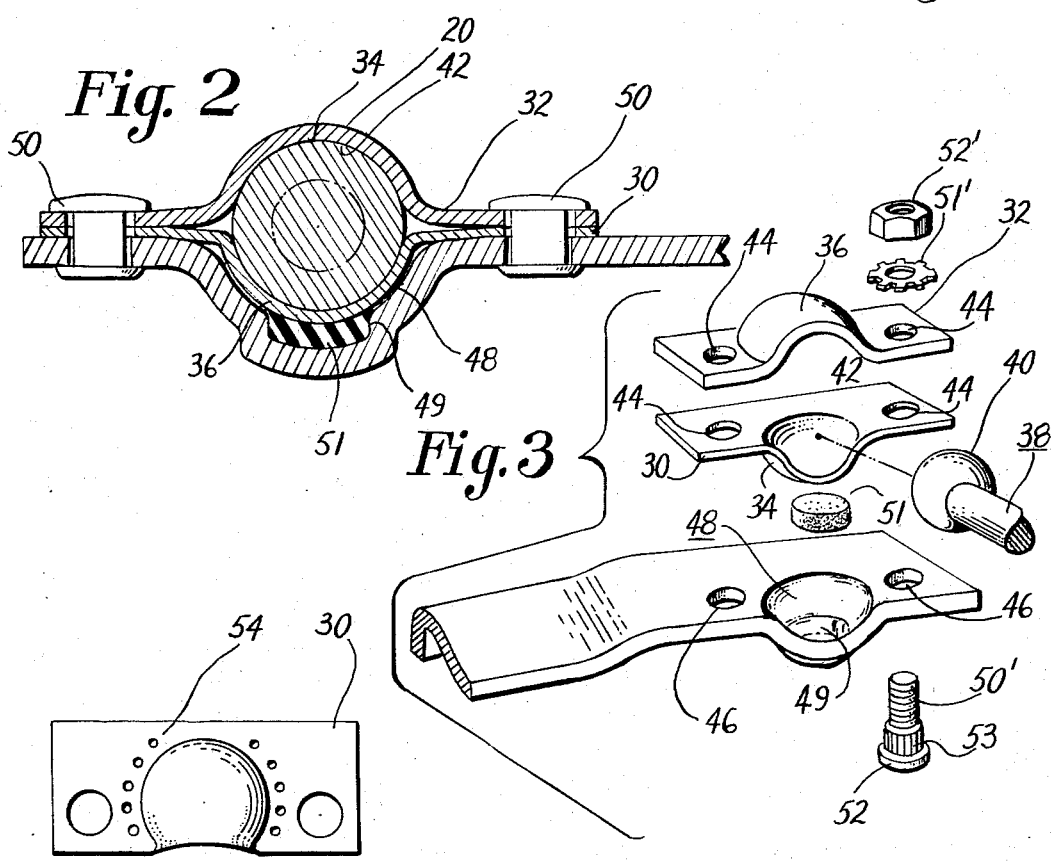
Fig. 2
Fig. 3
Fig. 4
INVENTOR.
JOHN R. OISHEI
BY E. Herbert Liss
ATTORNEY

United States Patent Office 3,292,958
Patented Dec. 20, 1966

3,292,958
TRANSMISSION LINKAGE ASSEMBLY
John R. Oishei, Buffalo, N.Y., assignor to Trico
Products Corporation, Buffalo, N.Y.
Filed June 10, 1964, Ser. No. 374,123
5 Claims. (Cl. 287—87)

The present invention relates to improved windshield wiper transmission linkage assemblies and, more particularly, to improved ball joints for pivotally securing pairs of link elements to each other.

In transmission linkage assemblies for motor vehicle windshield wiping apparatus, certain pivotal connections require a ball joint connection because of universal motion at a joint. Such ball joint assemblies include a pair of socket plates which have opposing complementary socket halves formed therein to provide a fit for a ball stud having a spherical end adapted to be received within the socket formed by the socket halves. An example of this type of ball joint is shown and described in copending application Serial No. 362,223 by Raymond A. Deibel, filed April 24, 1964. In this type of ball joint, suitable means are provided for rigidly clamping the socket plates to the link element and for clamping the plates together to retain the ball therebetween for universal pivotal movement.

Because of variations in the dimensions of the parts due to normal production tolerances and because of mass assembly techniques, the clamping means may be over-tightened. When this occurs, an excessive load is placed on the wiper motor in order to move the link elements relative to each other. Rigidity of the ball joint may cause immediate or eventual burn-out of the motor and, in less extreme cases, erratic and unsatisfactory wiper operation. Another problem inherent in certain presently known ball joint constructions for wiper transmission linkage is excessive looseness, resulting in erratic and noisy operation of the wiper system. Such looseness may occur either because of normal wear during use or because of the variations in dimensions arising from reasonable manufacturing tolerances.

The above-mentioned patent application Serial No. 362,223 overcomes these problems with a unique ball joint construction. The present invention is an improvement over the aforementioned ball joint construction shown in application Serial No. 362,223 in that it accomplishes all of the functions and, in addition, is simpler in construction, more economical and utilizes fewer parts.

The present invention may be utilized where it is desirable to detachably connect the ball and socket joint or where a permanent clamping means is employed to retain the joint in assembled condition. The unique construction of the present invention prevents over-tightening of the clamping means and prevents freeze-up or excessive rigidity of the ball joint while, at the same time, it assures sufficient snugness of the ball in the socket for maximum effectiveness in operation. It avoids a sloppy fit of a ball joint as well as reduces undue wear due to poor fit and provides means for wear compensation.

The principal object of the present invention is to provide an improved ball and socket joint which eliminates ball and socket joint freeze-up, but avoids looseness of the ball and which utilizes a minimum number of parts and simplified assembly technique.

Another object of the invention is to provide an improved resilient ball joint construction for windshield wiper linkage wherein either a detachable clamping arrangement or a permanent clamping arrangement for securing socket halves together and to a link element may be utilized.

Other objects and advantages of the invention will be apparent from the following detailed description taken in connection with the accompanying drawings in which:

FIG. 1 is a front elevational view of windshield wiper apparatus for a motor vehicle employing a linkage assembly which utilizes the ball joints of this invention;

FIG. 2 is a sectional view illustrating the ball and socket joint with permanent clamping means;

FIG. 3 is an exploded perspective view of the ball joint assembly of this invention utilizing detachable clamping means; and FIG. 4 is a plan view of a modified form of socket plate.

Briefly, the ball joint assembly of this invention includes a pair of ball joint socket plates having spherical socket halves formed therein. The socket plates are mounted on a linkage element having a spherical recess for receiving the socket half formed in one of the pair of socket plates. The socket halves are mounted in complementary opposing relation to form a socket for reception of a ball stud. The socket plate adjacent the link element which has its socket half received in the depression of the link element has a thickness smaller than the thickness of the other socket plate of the pair of socket plates and is therefore more resilient. The recess in the link element has a substantially centrally disposed depression for reception of a resilient disc. The socket half of the socket plate adjacent the link element is formed to provide clearance between the recess in the link element and the socket half. When the ball joint assembly is in assembled condition, the socket half received in the link recess engages the resilient element. This engagement with the resilient element causes the more resilient socket plate to flex into snug engagement with the ball stud received between the socket halves, but limits the tightness of this fit so that suitable mobility is obtained at the joint. The resilient disc compensates for dimensional differences in corresponding parts and for wear at the joint. In a modification of the invention, increased resiliency of the more resilient socket plate is obtained by providing openings on the flanges of the socket plate adjacent the socket half.

In FIG. 1 there is shown windshield wiper apparatus which includes the power unit 10. The power unit 10 may include a motor of any suitable type as, for example, a hydraulic motor, a vacuum motor, or an electric motor 12 and gear reduction unit 14 driven thereby, as shown. The output shaft, not shown, of the gear reduction unit 14 has mounted thereon for rotation therewith a motor crank arm 16 which is pivotally secured at one end to an elongated link element 18 which serves as a driving link. The crank arm 16 and link 18 may be pivotally secured to each other by a detachable ball and socket joint 20. Pivot shaft assemblies 22 are provided which are adapted to be mounted on the cowl of a motor vehicle and include rockshafts having driving burrs 23 upon which windshield wiper arms 24 are mounted for rotation therewith. The pivot shafts, not visible, at their inner ends have mounted thereon for rotation therewith crank arms 26 which are connected to each other at their free end through an elongated link 28. The elongated link 28 may be pivotally connected at each end to the crank arms 26 by a suitable pivotal connection. The link element 18 may be pivotally secured to one of the crank arms 26 by a permanently connected ball joint 20', as shown in FIG. 1. It will of course be understood that the ball joint of this invention may be utilized to pivotally connect any pair of linkage elements.

The ball and socket joints of this invention, most clearly shown in the permanently secured modification in FIG. 2 and the detachably secured modification in FIG. 3, include an inner socket plate 30 and an outer socket plate 32 which have formed therein opposed socket halves 34 and 36, respectively. The thickness of the socket plate 32 is greater than the thickness of the socket plate 30 and, as shown in the drawings, the difference in thickness between the socket plate 30 and socket plate 32 is in the ratio of two to one. Thus the socket plate 30 has greater resiliency than the socket plate 32. The socket plates 30 and 32 may be of any suitable material which provides a good bearing surface as, for example, Phosphor bronze. On one of the links of the pair of linkage elements a ball stud 38 is provided having a spherical head 40 for reception in the socket 42 formed by the socket halves 34 and 36 when assembled. The ball stud 38 may be rigidly mounted on a first link as, for example, at the free end of crank arm 16 with its spherical head 40 at its free end disposed intermediate the socket halves 34 and 36. The plates 30 and 32 include openings 44 on opposite sides of the socket halves. Corresponding openings 44 in the plates 30 and 32 are disposed in alignment. The plates may be mounted adjacent the end of a second link element as, for example, driving link 18. Driving link 18 includes a pair of openings 46 on opposite sides of a recess 48 formed therein. The recess 48 includes a centrally disposed substantially cylindrical depression 49 at the base thereof. The openings 46 in the link 18 are in alignment with corresponding openings 44 in the plates 30 and 32 and the recess portion 48 receives the socket 34 with a slight clearance between the walls of the recess 48 and the socket 34 adjacent the open end of the recess 48. A resilient disc 51 of suitable material as, for example, rubber, neoprene or other elastomeric material, is provided in the depression 49 and is of sufficient height to resiliently engage the socket 34 when the joint is in assembled condition. It should be further noted, as can be clearly seen in FIG. 2, that the socket halves are formed so as to provide a wedge shaped gap between the socket plates 30 and 32 adjacent the socket halves 34 and 36.

In the modification shown in FIG. 2 which corresponds to the ball joint at 20' in FIG. 1, a pair of rivets 50 are provided which extend through the openings 44 and 46 and form clamping elements to secure the socket plates together and to the link element 18 with the ball stud 40 received in the socket 42.

Thus it can be seen that with the assembly hereinabove described variations in the dimensions of the ball stud 40 or the socket 42 will be compensated for by the action of the resilient disc 51 on the lower side of the socket half 34. The periphery of the depression 49 substantially confines the resilient disc 51 thereby restricting lateral expansion of the resilient disc 51 so that the potential energy produced by the resistance to compression effects a resilient biasing reactionary thrust to cause a continuous and permanent clamping force which is applied about the surface of the ball. The force is applied when the parts are first assembled and continues to be effective to compensate for wear. This action, in cooperation with the resiliency of the lower socket plate 30, compensates for any variations in dimension to provide a snug fit of sufficient looseness to prevent interference with proper mobility at the joint. It will of course be understood that although a resilient disc is shown, in accordance with the broader aspects of the invention, any suitable resilient means as, for example but not limited to, a coil spring may be used.

In the modification shown in FIG. 3, the plates are clamped together and to the linkage element by screws 50' and nuts 52'. The screws 50' may include a head 52 and a knurled shoulder portion 53, which knurled shoulder 53 is press fittted into the openings 46 of the linkage element 18. A lock washer 51' may be interposed between the nut 52' and the socket plate 32, if desired.

Still another modification is shown in FIG. 4 wherein a plurality of openings 54 are provided in the plate 30 adjacent the socket half 34 to increase the resiliency of the plate 30. As shown, there are five openings on each side of the socket 34 and these openings may be of a diameter approximately one-eighth inch or smaller. In accordance with the broader aspects of the invention, any suitable number of openings of any suitable size may be utilized to provide the required resiliency.

It can thus be seen that compression of disc 51 compensates for dimensional differences of parts which occur during the manufacturing, as well as for wear during use and provides sufficient force to effect a proper fit of the ball 40 in the socket 42.

The function of this ball and socket joint construction should now be apparent. Clamping of the plates 30 and 32 with the ball 40 interposed therebetween in the socket 42 is accomplished by tightening the nut 52' to compress the resilient disc 51. Compression of the resilient disc 51 provides a force which acts on the resilient socket plate 30 to maintain the ball and socket joint in proper assembled relationship on the links and to provide a universal pivotal connection. The same action occurs when the rivets 50 are compressed to secure the socket plates and the link together.

It should now be apparent that a unique ball and socket joint for windshield wiper linkage assemblies has been provided. Certain specific embodiments of the invention have been described for the purpose of illustration, but it will be apparent that various modifications and other embodiments are possible within the scope of the invention. It is to be understood, therefore, that the invention is not limited to the specific arrangement shown, but in its broadest aspect includes all equivalent embodiments and modifications which come within the scope of the invention.

What is claimed is:

1. In a link constructed for a windshield wiper system including a pair of linkage elements pivotally secured to each other by a ball joint; a ball joint assembly comprising a linkage element having a substantially spherical recess and a depression formed in the wall of said spherical recess, a resilient socket biasing member received in said depression, a pair of socket plates having complementary opposing socket halves formed therein, said socket plates secured together and to said linkage element, one of said socket plates having less material therein than the other so as to be of greater resiliency than the other of said socket plates, said one of said socket plates having its socket half received in said spherical recess in compressive engagement with said resilient socket biasing means and a ball stud disposed between said socket halves.

2. In a linkage construction for a windshield wiper system including a pair of linkage elements pivotally secured to each other by a ball joint; a ball joint assembly comprising a linkage element having a substantially spherical recess and a depression formed in the wall of said spherical recess, a resilient socket biasing member received in said depression, a pair of socket plates having complementary opposing socket halves formed therein, said socket plates secured together and to said linkage element, one of said socket plates being of lesser thickness and greater resiliency than the other of said socket plates, said one of said socket plates having its socket half received in said spherical recess in compressive engagement with said resilient socket biasing means and a ball stud disposed between said socket halves.

3. In a linkage construction for a windshield wiper system including a pair of linkage elements pivotally secured to each other by a ball joint; a ball joint assembly comprising a linkage element having a substantially spherical recess and a depression formed in the wall of said spherical recess, a resilient socket biasing member received in said depression, a pair of socket plates having complementary opposing socket halves formed therein, said socket plates secured together and to said linkage element, one of said socket plates being conformed so as to be more resilient than the other of said socket plates, said one of said socket plates having its socket half received in said spherical recess with at least a portion thereof being spaced from the walls of said spherical recess and a portion thereof in compressive engagement with said resilient socket biasing means and a ball stud disposed between said socket halves.

4. In a linkage construction for a windshield wiper system including a pair of linkage elements pivotally secured to each other by a ball joint; a ball joint assembly comprising a linkage element having a substantially spherical recess and a depression formed in the wall of said spherical recess, a resilient socket biasing member received in said depression, a pair of socket plates having complementary opposing socket halves formed therein, said socket plates secured together and to said linkage element, said socket plates having a portion thereof adjacent said socket halves spaced from each other, one of said socket plates being of lesser thickness and greater relisiency than the other of said socket plates, said one of said socket plates having its socket half received in said spherical recess with at least a portion thereof being spaced from the walls of said spherical recess and a portion thereof in compressive engagement with said resilient socket biasing means and a ball stud disposed between said socket halves.

5. In a linkage construction for a windshield wiper system including a pair of linkage elements pivotally secured to each other by a ball joint; a ball joint assembly comprising a linkage element having a substantially spherical recess and a depression formed in the wall of said spherical recess, a resilient socket biasing member received in said depression, a pair of socket plates having complementary opposing socket halves formed therein, said socket plates secured together and to said linkage element, one of said socket plates having a plurality of openings adjacent its socket half for increasing its resiliency, said one of said socket plates having its socket half received in said spherical recess with at least a portion thereof being spaced from the walls of said spherical recess and a portion thereof in compressive engagement with said resilient socket biasing means and a ball stud disposed between said socket halves.

References Cited by the Examiner

UNITED STATES PATENTS

| 2,861,827 | 11/1958 | Langen et al. | 287—90 |
| 2,960,348 | 11/1960 | Sarowski et al. | 287—87 X |

FOREIGN PATENTS

| 567,717 | 1/1933 | Germany. |
| 829,998 | 3/1960 | Great Britain. |

CARL W. TOMLIN, *Primary Examiner.*

A. V. KUNDRAT, *Assistant Examiner.*